United States Patent
Johnson et al.

(10) Patent No.: US 7,696,089 B1
(45) Date of Patent: Apr. 13, 2010

(54) PASSIVATED THIN FILM AND METHOD OF PRODUCING SAME

(75) Inventors: Lonnie G. Johnson, Atlanta, GA (US); Davorin Babic, Marietta, GA (US)

(73) Assignee: Johnson Research & Development Co., Inc., Atlanta, GA (US)

( * ) Notice: Subject to any disclaimer, the term of this patent is extended or adjusted under 35 U.S.C. 154(b) by 550 days.

(21) Appl. No.: 11/125,976

(22) Filed: May 10, 2005

Related U.S. Application Data

(60) Provisional application No. 60/569,986, filed on May 11, 2004.

(51) Int. Cl.
 *H01L 21/44* (2006.01)
(52) U.S. Cl. .................. 438/674; 438/675; 438/688
(58) Field of Classification Search ............ 438/675, 438/674, 688
 See application file for complete search history.

(56) References Cited

U.S. PATENT DOCUMENTS

| | | | | |
|---|---|---|---|---|
| 3,237,078 A | | 2/1966 | Mallory ..................... 320/17 |
| 3,647,585 A | * | 3/1972 | Fritzinger et al. ............ 216/15 |
| 4,154,902 A | | 5/1979 | Schwartz ..................... 429/15 |
| 4,303,877 A | | 12/1981 | Meinhold ...................... 320/6 |
| 4,519,851 A | * | 5/1985 | Perry et al. ................. 148/286 |
| 4,614,905 A | | 9/1986 | Petersson et al. ............ 320/18 |
| 4,654,281 A | | 3/1987 | Anderman et al. .......... 429/232 |
| 4,719,401 A | | 1/1988 | Altnejd ....................... 320/13 |
| 4,944,836 A | * | 7/1990 | Beyer et al. ................. 438/633 |
| 4,996,129 A | | 2/1991 | Tuck .......................... 429/194 |
| 5,098,860 A | * | 3/1992 | Chakravorty et al. ........ 438/628 |
| 5,270,635 A | | 12/1993 | Hoffman et al. .............. 320/21 |
| 5,291,116 A | | 3/1994 | Feldstein ....................... 320/4 |
| 5,314,765 A | | 5/1994 | Bates .......................... 429/194 |
| 5,336,573 A | | 8/1994 | Zuckerbrod et al. ......... 429/252 |
| 5,338,625 A | | 8/1994 | Bates et al. ................. 429/193 |
| 5,362,581 A | | 11/1994 | Chang et al. ................ 429/249 |
| 5,387,857 A | | 2/1995 | Honda et al. .................. 320/17 |
| 5,411,592 A | | 5/1995 | Ovshinsky et al. .......... 118/718 |
| 5,445,906 A | | 8/1995 | Hobson et al. .............. 429/162 |
| 5,455,126 A | | 10/1995 | Bates et al. ................. 429/127 |
| 5,512,147 A | | 4/1996 | Bates et al. ............ 204/192.15 |

(Continued)

OTHER PUBLICATIONS

Dini, J. W. (1993). Electrodeposition—The Materials Science of Coatings and Substrates. William Andrew Publishing/Noyes. pp. 249-278.*

(Continued)

*Primary Examiner*—Matthew Smith
*Assistant Examiner*—Vicki B Booker
(74) *Attorney, Agent, or Firm*—Baker Donelson

(57) ABSTRACT

A method of producing a passivated thin film material is disclosed wherein an insulating thin film layer (10), having pinholes (12) therein, is positioned upon an underlying electrically conductive substrate (11). The thin film layer is then electroplated so that the pinholes are filled with a reactive metal. The thin film layer and substrate are then immersed within a silicon doped tetramethylammonium hydroxide (TMAH) solution. Excess silica within the solution precipitates onto the top surfaces of the aluminum plugs (13) to form an electrically insulative cap which electrically insulates the top of the aluminum plug. As an alternative, the previously described metal plugs may be anodized so that at least a portion thereof becomes an oxidized metal which is electrically insulative.

9 Claims, 1 Drawing Sheet

U.S. PATENT DOCUMENTS

| | | | |
|---|---|---|---|
| 5,561,004 A | 10/1996 | Bates et al. ................. | 429/162 |
| 5,567,210 A | 10/1996 | Bates et al. ................. | 29/623.5 |
| 5,569,520 A | 10/1996 | Bates ......................... | 429/162 |
| 5,589,291 A | 12/1996 | Carlin et al. ................ | 429/103 |
| 5,597,660 A | 1/1997 | Bates et al. ................. | 429/191 |
| 5,612,152 A | 3/1997 | Bates ......................... | 429/152 |
| 5,654,084 A | 8/1997 | Egert ......................... | 428/215 |
| 5,778,515 A | 7/1998 | Menon ....................... | 28/623.4 |
| 5,783,928 A | 7/1998 | Okamura .................... | 320/122 |
| 5,811,205 A | 9/1998 | Andrieu et al. ............. | 429/137 |
| 5,821,733 A | 10/1998 | Turnbull ..................... | 320/116 |
| 5,932,375 A | 8/1999 | Tarcy et al. ................. | 429/231 |
| 6,103,639 A * | 8/2000 | Chang et al. ................ | 438/778 |
| 6,187,472 B1 | 2/2001 | Shiota et al. ................ | 429/127 |
| 6,197,450 B1 | 3/2001 | Nathan et al. ............... | 429/236 |
| 6,235,425 B1 | 5/2001 | Hanson et al. .............. | 429/209 |
| 6,248,601 B1 * | 6/2001 | Chou .......................... | 438/14 |
| 6,284,406 B1 | 9/2001 | Xing et al. ................... | 429/96 |
| 2002/0004293 A1 * | 1/2002 | Soininen et al. ............. | 438/584 |
| 2002/0071989 A1 * | 6/2002 | Verma et al. ................ | 429/176 |
| 2003/0075808 A1 * | 4/2003 | Inoue et al. ................. | 257/774 |
| 2003/0157809 A1 * | 8/2003 | Geist .......................... | 438/745 |

OTHER PUBLICATIONS

Rosato, D. V. (1993) Rosato's Plastics Encyclopedia and Dictionary. Oxford University Press. p. 223.*
McGraw Hill Dictionary of Scientific and Technical Terms; 2003; Sixth Edition; The McGraw-Hill Companies, Inc.; p. 107.*
Whitten and Gailey, "General Chemistry", 1981, Saunders College Publishing, p. 704-720.*
K. Seshan, Editor; "Handbook of Thin-Film Deposition Processes and Techniques—Principles, Methods, Equipment and Applications"; 2002; William Andrew Publishing/Noyes; pp. 11-43.*
Journal of Power Sources 68 (1997) pp. 65-68 "Thin film solid electrolytes and electrodes for rechargeable lithium-ion batteries" J. Schoonman & E.M. Kelder.

* cited by examiner

PASSIVATED THIN FILM AND METHOD OF PRODUCING SAME

REFERENCE TO RELATED APPLICATIONS

This application claims the benefit of U.S. Provisional Application No. 60/569,986, filed May 11, 2004.

TECHNICAL FIELD

This invention relates to passivated thin film material and methods of passivating thin film materials.

BACKGROUND OF THE INVENTION

Thin film materials are utilized today to produce many types of electrochemical devices, such as thin film batteries. In producing such thin film materials, pinholes are often formed which extend through the material. This is especially true of thin films deposited in large scale manufacturing processes. Unfortunately, the presence of the pinholes generally destroys or at least greatly reduces the functionality of the thin films. Thus, a technique that corrects the pinhole defect in thin films is highly desirable.

Accordingly, it is seen that a need exists for a method of limiting the negative effects of pinholes formed in a thin film material. It is to the provision of such therefore that the present invention is primarily directed.

SUMMARY OF THE INVENTION

In a preferred form of the invention a passivated thin film is disclosed for use in connection with electrochemical devices. The thin film comprises a layer of insulating thin film material having pinholes therein, metal plugs positioned within the pinholes, and an electrically insulative cap positioned upon the metal plug. As an alternative to the insulative cap, the metal plug may be anodized so that a portion of the metal plug is anodized to become electrically insulative.

In another preferred form of the invention, a method of passivating a thin film layer comprises the steps of providing a thin film layer having pinholes therein, positioning an electrically conductive substrate adjacent one surface of the thin film layer, filling the thin film layer pinholes with a filling material, and forming an electrically insulative cap over each filled pinhole. As an alternative to the step of forming an insulative cap, the pinhole filling material may be anodized to become electrically insulative.

DETAILED DESCRIPTION

Electrochemical devices, such as thin film batteries, typically include components which are formed from thin film material layers. The thin film electrolyte layer of these batteries oftentimes is formed with pinholes which severally limit the function or operation of the electrolyte, as they may collect electrically conductive materials which form a conductive bridge through the electrolyte. A problem remains with regard to passivating the layers or particularly the pinholes without electrically insulating the entire thin film structure. The present invention is directed to a method of passivating these pinholes so as to restrict the damaging effect of the pinholes without effectively hampering the intended capabilities of the thin film material.

Figure 1:
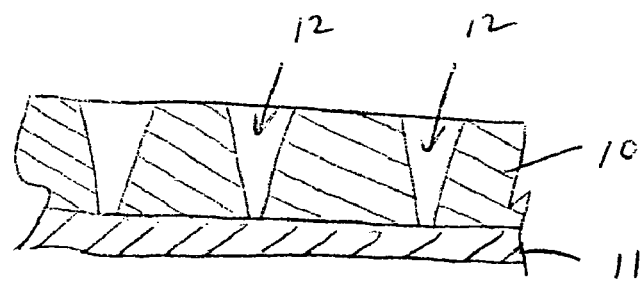
FIGS. 1-3 are a sequence of cross-section side views of the method embodying principles of the invention in a preferred form.
Figure 2:
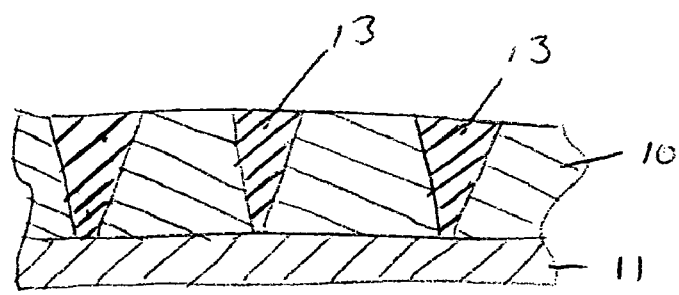
Figure 3:
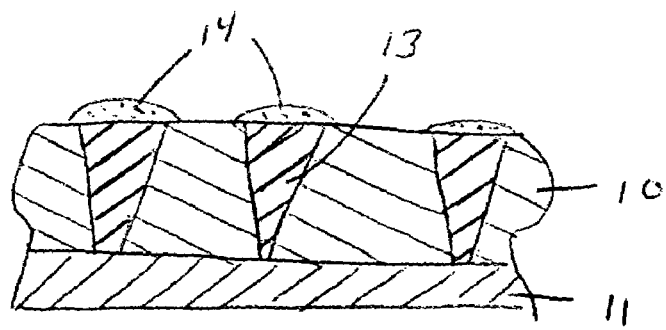

With reference to FIGS. 1-3, the current method commences with an insulating thin film layer 10, such as a layer of polymer, ceramic, glass or other suitable insulating material. The thin film layer 10 is positioned upon an underlying electrically conductive substrate 11, which may be formed integrally with or separate from the thin film layer 10. As with most thin film electrolytes, the thin film layer 10 includes pinholes 12, as shown in FIG. 1.

In the next step of the present method shown in FIG. 2, the pinholes 12 within the thin film layer 10 are electroplated with a metal, such as aluminum, chromium, zinc, titanium, or other electroplateable semi-conductor material or electroplateable polymer material, such as silicon. As used herein electroplateable semi-conductor and polymer materials are considered to be a metal for all descriptive purposes, including the written claims. The description of the present invention hereby utilizes aluminum as the representative metal.

The electroplating process is achieved by immersing the thin film layer 10 and substrate 11 in an ether-based solution, such as an $AlCl_3+LiAlH_4$ solution, and providing a conventional charge to electroplate aluminum into the pinholes. The aluminum is electroplated exclusively within the pinholes 12 since the pinholes 12 provide conductive paths through the electrically conductive substrate 11.

The thin film layer 10 and substrate 11 are then removed from electroplating solution and then immersed within a silicon doped tetramethylammonium hydroxide (TMAH) solution for a period of up to approximately ten minutes. The TMAH solution is maintained at approximately 80 degrees C. and has a silicon content of approximately 90 grams per liter. As a result of the chemical reaction between the aluminum plugs 13 and the TMAH solution, excess silica (silicon dioxide, $SiO_2$) within the solution precipitates onto the top surfaces of the aluminum plugs 13. The precipitated silica forms an approximately 50 nm thick silica cap 14 upon the aluminum plug 13, as shown in FIG. 3. This silica cap 14 electrically insulates the top of the aluminum plug 13. Thus, it should be understood that the pinholes of the thin film layer 10 are now filled with the aluminum filling material which is electrically insulated to maintain the usefulness of the thin film layer for its intended purpose, i.e., the thin film layer is passivated.

Figure 4:
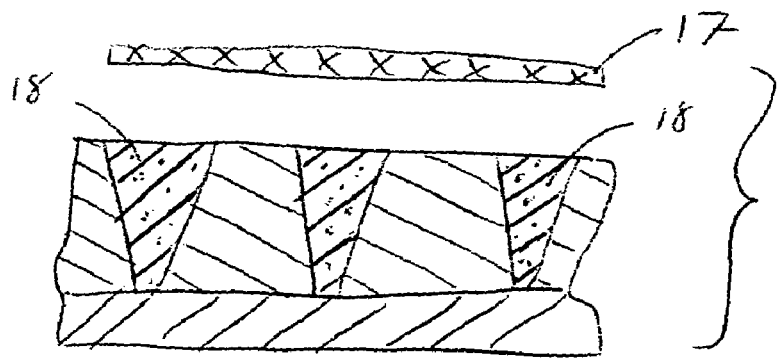
FIG. 4 is a cross-sectional side view of the last step of an alternative method of the present invention.

With reference next to FIG. 4, there is shown an alternative method to that just described. Here, the pinholes of the thin film layer 10 are filled with aluminum plugs 13 as previously described and shown in FIGS. 1 and 2. Here, other suitable metals include aluminum, titanium, nickel, zinc, chrome or silicon. However, rather than immersing the thin film layer 10 and substrate 11 in a TMAH solution to form an insulative cap, the aluminum plug is anodized as described in more detail herein.

The thin film layer 10 and substrate 11 is immersed in an anodizing solution, for example a solution of weak acid such as a 10% by weight phosphoric acid. An approximately 30 volt d.c. current with a current density of approximately 180 $mA/cm^2$ is then passed between a cathode 17 within the solution and the underlying anodizing substrate 11 which is considered to be an anode. The acid and electric current causes electrochemical oxidation of the aluminum which converts the aluminum to aluminum oxide plugs 18. This conversion commences at the top of the aluminum plug and progresses downward through the plug. The extent of the conversion depends upon the current and its duration. The aluminum oxide is electrically insulating, therefore, the pinholes 12 are plugged and filled with an at least partially insulative material so that the thin film layer 10 is passivated. In other words, the anodization changes at least a portion of the metal plugs to an electrically insulative metal oxide material.

It should be understood that the just identified process of anodization may be utilized with any of the identified metals or silicon through their oxidation.

While this invention has been described in detail with particular reference to the preferred embodiments thereof, it should be understood that many modifications, additions and deletions, in addition to those expressly recited, may be made thereto without departure from the spirit and scope of invention as set forth in the following claims.

The invention claimed is:

1. A method of passivating a thin film layer comprising the steps of:
    (a) providing a thin film layer having pinholes therein;
    (b) positioning an electrically-conductive substrate adjacent one surface of the thin film layer;
    (c) filling the thin film layer pinholes with an electrically-conductive filling material; and
    (d) converting at least a portion of said electrically-conductive filling material to an electrically-insulative cap over the filled pinholes.

2. The method of claim 1 wherein the electrically-conductive filling material is a metal.

3. The method of claim 2 wherein the metal, electrically-conductive filling material is selected from the group consisting of aluminum, chromium, zinc, titanium and silicon.

4. The method of claim 3 wherein in step (c) the pinholes are filled with a metal, electrically-conductive filling material by electroplating the thin film layer.

5. The method of claim 4 wherein in step (d) the electrically-insulative cap is a silicon dioxide, electrically-insulative cap formed by immersing the thin film layer in a silicon-doped tetramethylammonium hydroxide (TMAH) solution.

6. A method of passivating a thin film layer comprising the steps of:
    (a) providing a thin film layer having pinholes therein;
    (b) positioning an electrically-conductive substrate adjacent one surface of the thin film layer;
    (c) filling the thin-film-layer pinholes with an electrically-conductive, metal filling material; and
    (d) anodizing at least a portion of the metal filling material within the pinholes to form a metal oxide.

7. The method of claim 6 wherein the electrically-conductive, metal filling material is selected from the group consisting of aluminum, titanium, nickel, zinc, chrome, or silicon.

8. The method of claim 6 wherein step (c) the pinholes are filled with an electrically-conductive, metal filling material by electroplating the thin film layer.

9. The method of claim 8 wherein the electrically-conductive, metal filling material is selected from the group consisting of aluminum, titanium, nickel, zinc, chrome, or silicon.

* * * * *